Figure 1:
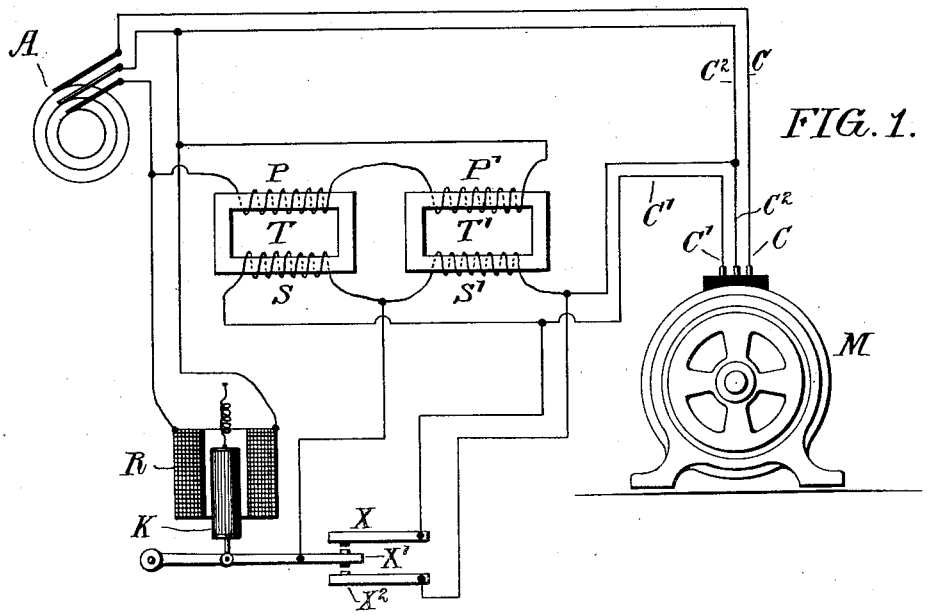

No. 808,944. PATENTED JAN. 2, 1906.
E. H. PORTER & B. CURRIER.
ALTERNATING CURRENT MOTOR REVERSER.
APPLICATION FILED MAR. 29, 1905.

2 SHEETS—SHEET 1.

WITNESSES:

INVENTORS
Edwin H. Porter and
Burleigh Currier
BY
ATTORNEY.

No. 808,944. PATENTED JAN. 2, 1906.
E. H. PORTER & B. CURRIER.
ALTERNATING CURRENT MOTOR REVERSER.
APPLICATION FILED MAR. 29, 1905.

2 SHEETS—SHEET 2.

WITNESSES:

INVENTORS
Edwin H. Porter and
Burleigh Currier
BY
ATTORNEY.

UNITED STATES PATENT OFFICE.

EDWIN H. PORTER AND BURLEIGH CURRIER, OF PHILADELPHIA, PENNSYLVANIA.

ALTERNATING-CURRENT-MOTOR REVERSER.

No. 808,944.　　　Specification of Letters Patent.　　　Patented Jan. 2, 1906.

Application filed March 29, 1905. Serial No. 252,615.

*To all whom it may concern:*

Be it known that we, EDWIN H. PORTER and BURLEIGH CURRIER, citizens of the United States, residing at Philadelphia, in the county of Philadelphia and State of Pennsylvania, have invented certain new and useful Improvements in Alternating-Current-Motor Reversers, of which the following is a specification.

Our invention relates to alternating-current motors of commercial types, and particularly to means for reversing their direction of rotation.

The object of our invention is to provide a simple, non-sparking, quick-acting means of reversing alternating-current motors and one that reverses the motor instantly when applied and which is without complicated switching mechanism, more particularly one that lends itself readily to operation in connection with a relay from a source of alternating-current energy, making it automatic in its action.

Our invention is particularly useful in the automatic operation of rheostats, (either inductive or non-inductive,) valves that regulate the supply of steam or water to prime movers, or, in fact, is useful in any form of regulator that embodies in its application a reversing movement.

It is well known that any alternating-current motor can be reversed in rotation by reversing the relative direction of the current in any one of its independent energizing-circuits. In an induction-motor reversing any one of its separate phased circuits relative to its mates or in a series motor of the armature type reversing the armature or field circuit gives a reversal in direction of its rotation. We have endeavored to produce this reversal of the energizing-circuits in a positive, quick-acting, simple manner free from any sparking contacts.

Our invention contemplates using motors of the standard types in commercial practice, with the circuits connected and the power supplied as in commercial practice, except in the circuit that is to be reversed. In this circuit we supply two alternating electromotive forces or currents of opposing phase relation in series whose algebraic sum is zero. Then by weakening either one of the electromotive forces or short-circuiting it entirely leaves the other electromotive force in part or fully supplying current in the desired direction.

Throughout the specification the term "electromotive force" is abbreviated as "E. M. F."

Throughout the drawings like parts or elements have the same letter.

Figure 2:
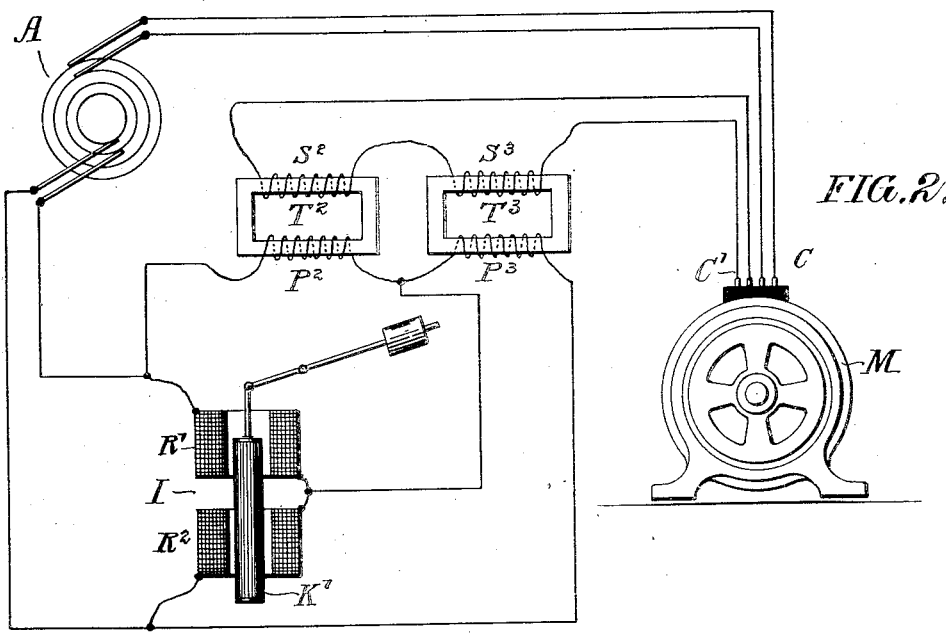
Figure 3:
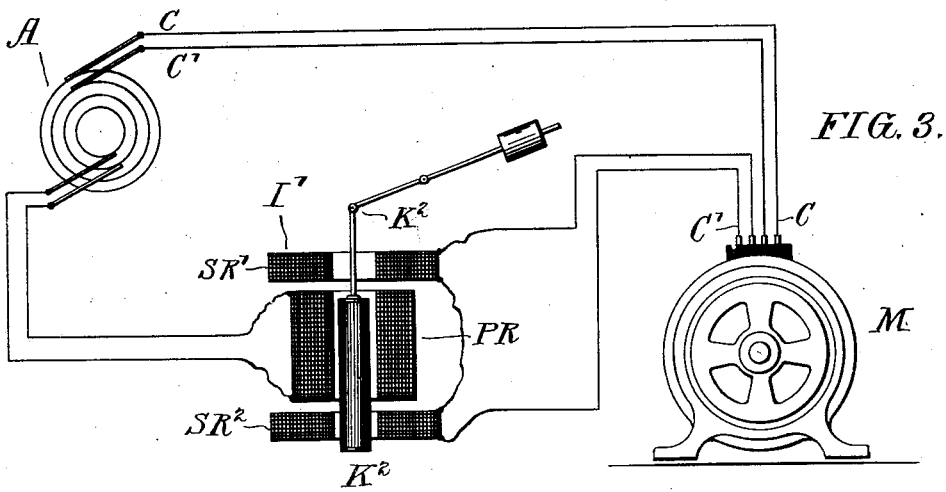
Figure 4:
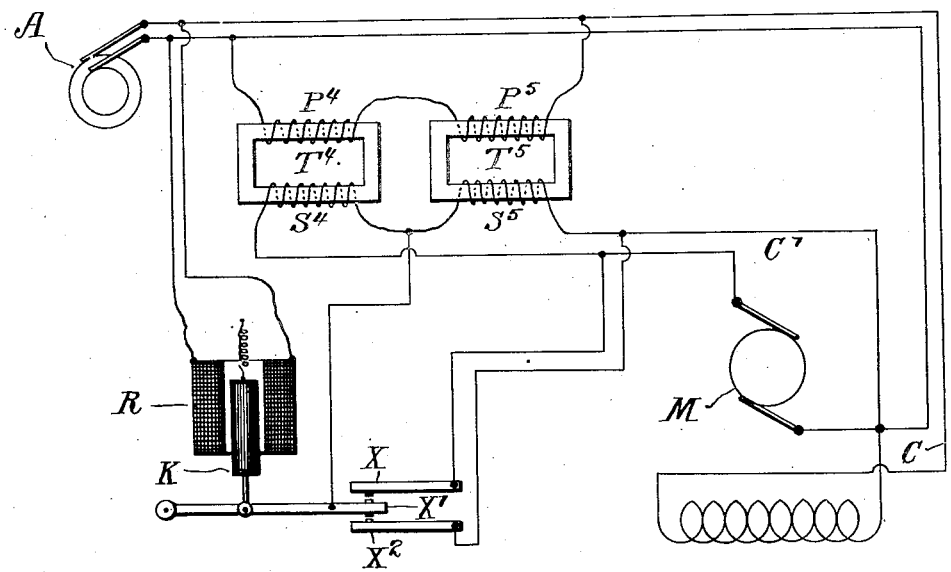

Referring to the drawings, in which we represent our invention as applied to single, two, and three phase motors, making no distinction in the type of motor, Figure 1 is a diagrammatic view showing an induction-motor with reversing-transformers, short-circuiting contacts, and regulating-solenoid with core, in conjunction with an alternating-current source of energy. Fig. 2 is a similar view showing an induction-motor with reversing-transformers in connection with an induction-regulator and a source of alternating-current energy. Fig. 3 is a similar view showing an induction-motor in connection with a combination of the reversing-transformers and the induction-regulator in one, together with the source of alternating-current energy. Fig. 4 is a similar view showing a commutator type of motor in connection with reversing-transformers, short-circuiting contacts, regulating-solenoid, and a source of alternating-current energy.

In the drawings, A is a source of alternating-current energy, which may be any suitable source available. M is a motor adapted to be operated by the energy supplied by the said source.

C, C', and C² are separate energizing-circuits of the motor and extending to the generator or source A.

T, T', T², T³, T⁴, and T⁵ are transformers having primary coils P, P', P², P³, P⁴, and P⁵ and secondary coils S, S', S², S³, S⁴, and S⁵.

R is a solenoid shown connected across the circuit C', so as to have its core K responsive to variations of the current in the solenoid R.

Contacts X, X', and X² are connected to the terminals of the transformers T, T', T⁴, and T⁵ electrically and to the core K of solenoid R mechanically.

I represents an induction-regulator having two coils R' and R² and a movable counterbalanced core K'.

I' represents an induction-regulator having a counterbalanced core K², primary coil PR, and secondary coils SR' and SR².

As shown, the energizing-circuit C is supplied direct from its normal source of energy, as in standard practice. Circuit C² is similarly supplied. The energizing-circuit C' is shown as supplied from its normal source of energy, but in series with or through reversing-transformers T, T', T², T³, T⁴, and T⁵ in such a manner that two opposing and approximately equal E. M. F.'s are in series in the circuit C'. It is evident that if either of the opposing E. M. F.'s are weakened or short-circuited entirely and the other either remains the same or is correspondingly increased, as shown, a resultant E. M. F. will be applied to the circuit C' in either direction, as desired.

In Figs. 1 and 4 are shown the reversing-transformers T and T', also T⁴ and T⁵, having the secondary coils S and S' in series, also S⁴ and S⁵ in series, and by pairs in series with the energizing-circuit C' of the motor M. The primaries of the transformers T and T' are in series, also the primaries of transformers T⁴ and T⁵, and each primary is wound to operate on the full E. M. F. of its source A. The secondary S is shown connected at its terminals to the contacts X and X'; also, the secondary S' is connected to contacts X' and X². Similarly, the secondaries S⁴ and S⁵ are shown as connected, respectively, to their contacts X X' and X' X². It is evident that if in Fig. 1 contacts X and X' are brought together they short-circuit secondary S, neutralizing the impedance of primary P, applying the full E. M. F. to primary P', and thus to secondary S' and to energizing-circuit C' in a given direction, or if contacts X and X' are separated and contacts X' and X² are brought together they short-circuit secondary S', neutralizing the impedance of primary P', leaving the full E. M. F. applied to primary P, thus to secondary S and the energizing-circuit C' in the reverse relation. The movements of the contacts X, X', and X² are controlled by the solenoid R. The mode of operation in Fig. 4 is the same. In Fig. 2 the coils R' and R² of the induction-regulator I, which are connected in series and supplied from the source of energy A, together with the circuit C', each have their relative drop of potential varied by the position of the iron core K'. The potential drop over each coil is supplied through the transformers T² and T³ in series to the energizing-circuit C', so that one E. M. F. opposes the other. It is evident as the balancing of the E. M. F.'s is varied their resultant as applied to circuit C' is varied in direction and, as above described, the relative direction of the current in the energizing-circuit C' is varied.

The method of operation of our motor-reverser is as follows: As shown in Figs. 1, 2, 3, and 4, it is arranged as responsive to variations of potential as applied, as it would be used in operating an inductive regulator or similar device to maintain a constant potential on a feeder. Alternating current is supplied to one circuit of the motor to be reversed in Figs. 1, 2, and 3 through a pair of transformers whose primaries are in series and whose secondaries supply an E. M. F. each in opposition to its mate. It is evident that with both transformers supplying an E. M. F. in opposing directions and equal to its mate their resultant would be zero and no current would flow in the motor-circuit supplied by them. As shown, if the potential applied to solenoid R, Figs. 1 and 4, is increased the core K is drawn in, contacts X and X' are closed, short-circuiting secondary S, Fig. 1, or S⁴, Fig. 4, allowing the full E. M. F. of secondary S', Fig. 1, or S⁵, Fig. 4, to be applied to the motor-circuit. If the potential as applied to solenoid R is decreased, the solenoid R lowers its core K, closing contacts X' and X², short-circuiting coils S', Fig. 1, or S⁵, Fig. 4, leaving coils S, Fig. 1, or S⁴, Fig. 4, feeding the motor-circuit in the reverse direction. It is evident that short-circuiting the secondary coil in either case not only removes its opposing E. M. F., but also cuts out the impedance of its corresponding primary coil, leaving the whole applied primary E. M. F. applied to one primary coil, so giving double the applied E. M. F. to the primary, and therefore double E. M. F. to the secondary, over what was supplied by each secondary coil when they were in opposition. The same method of operation applies to Fig. 2 and Fig. 3, with the difference that an increase in potential as applied to coils R' and R², Fig. 2, or on coils PR in Fig. 3, raises the core K', Fig. 2, or K², Fig. 3, which by induction increases the opposing E. M. F. in coil R', Fig. 2, or coil SR', Fig. 3, and weakens the E. M. F. in coils R², Fig. 2, or SR², Fig. 3. A decrease of potential applied to the coils R' and R², Fig. 2, or coil PR, Fig. 3, has the reverse influence on the two opposing E. M. F.'s, increasing one and decreasing the other. In all four cases the unbalancing of the applied E. M. F.'s opposing each other gives a resultant E. M. F. applied to the motor-circuit, and therefore a resultant current flowing in the motor-circuit in a controlled direction.

In Fig. 3 the coil PR of the induction-regulator I' is energized from source A. Raising or lowering the core K² varies its inductive relation to the secondary coils SR' and SR². Therefore their E. M. F., which is applied in series opposing each other, as in Figs. 1, 2, and 4, varies the direction of the current in the energizing-circuit C'.

It is evident, as shown in our former applications, Serial Nos. 227,520 and 227,521, that the reversal of the current in the above manner is accomplished without spark, for, as in Figs. 1 and 4, when the short circuit is made on one secondary coil there is no spark and when the short circuit is removed there is no spark, for the E. M. F. is met by an equal E. M. F. in the opposite direction. It is also evident that while we show only a potential responsive solenoid and a constant-potential motor either the solenoid or motor, or both, can as readily be wound for a series-current application of energy, which we would not consider as differing from our invention.

It is evident that while in the induction-motor shown, where for simplicity we have shown the variable voltage as applied to only one phase, the same means of varying the resultant voltage can be applied to as many of the different phases as desired.

Having thus described our invention, we claim and desire to secure by Letters Patent—

1. The combination of a source of alternating-current energy, a motor connected with and adapted to operate from said source of energy having a plurality of energizing-circuits, part of which energizing-circuits is supplied with two opposing alternating electromotive forces in series and means for automatically varying one or both the opposing electromotive forces so that their sum is greater or less than zero, as desired, substantially as described.

2. The combination of a source of alternating-current energy, a motor connected with and adapted to operate from said source of energy having a plurality of energizing-circuits, part of which energizing-circuits is supplied with two equal opposing electromotive forces in series and means for automatically varying one or both the opposing electromotive forces so that their sum is either greater or less than zero, substantially as described.

3. The combination of a source of alternating-current energy, a motor connected with and adapted to operate from said source of energy, having a plurality of energizing-circuits, part of which energizing-circuits is supplied with an alternating electromotive force that is a variable resultant of two alternating opposing equal electromotive forces in series, one or both of which are automatically varied to produce the said resultant alternating electromotive force and means for varying the opposing electromotive forces, substantially as described.

4. The combination of a source of alternating-current energy, a motor connected with and adapted to operate from said source of energy, having a plurality of independent energizing-circuits, part of which energizing-circuits is supplied with an alternating electromotive force that is a variable resultant of two opposing alternating electromotive forces in series, one of which is automatically short-circuited to produce the desired resultant electromotive force and means for short-circuiting either of said opposing electromotive forces, substantially as described.

5. The combination of a source of alternating-current energy, a motor connected with and adapted to operate from said source of alternating-current energy, having a plurality of independent energizing-circuits, said energizing-circuits each supplied with an alternating electromotive force that is a variable resultant of two alternating opposing equal electromotive forces in series, one or both of which are automatically varied to produce the desired resultant electromotive force and means of varying said opposing electromotive forces, substantially as described.

6. The combination of a source of alternating-current energy, a motor connected with and adapted to operate from said source of energy, having a plurality of independent energizing-circuits, each of which is supplied with an alternating electromotive force that is a variable resultant of two alternating opposing electromotive forces in series, one of which is short-circuited to produce the desired resultant electromotive force and means for short-circuiting either of said opposing electromotive forces, substantially as described.

7. The combination of a multiphase source of alternating-current energy, a multiphase motor, having a plurality of independent energizing-circuits energized by said source, pairs of transformers having their secondaries opposed and in series with each independent energizing-circuit, primaries of each pair of said transformers in series and connected to said source of alternating-current energy and means for short-circuiting the secondary of either transformer of each pair, substantially as described.

8. The combination of a multiphase source of alternating-current energy, a multiphase motor, having a plurality of independent energizing-circuits energized from said source, two transformers having their secondaries opposed in series and connected to one of said energizing-circuits, their primaries also in series and connected to said source of energy and means for short-circuiting the secondary of either transformer.

9. The combination of a multiphase source of alternating-current energy, a multiphase motor having a plurality of energizing-circuits energized by said source, part of said energizing-circuits supplied with alternating electromotive forces each of which is a variable resultant of two opposing alternating electromotive forces in series, one or both of which are automatically varied to produce said resultant, and means for automatically varying either or both of said opposing electromotive forces, substantially as described.

In testimony whereof we affix our signatures in presence of two witnesses.

EDWIN H. PORTER.
BURLEIGH CURRIER.

Witnesses:
WM. A. ALLISON,
WM. R. STACKHOUSE.